United States Patent [19]

Heath

[11] Patent Number: 5,042,754

[45] Date of Patent: Aug. 27, 1991

[54] DEVICE FOR LOCKING AIRCRAFT CONTROLS

[76] Inventor: Ralph Heath, Suncoast Seabird Sanctuary, 18323 Sunset Blvd., Redington Shores, Fla. 33708

[21] Appl. No.: 437,412

[22] Filed: Nov. 14, 1989

[51] Int. Cl.⁵ .................. B64C 3/14; B65D 55/14
[52] U.S. Cl. .................. 244/224; 70/58; 70/167; 70/211; 70/163
[58] Field of Search .............. 244/224; 70/14, 19, 70/20, 25, 26, 38 R, 39, 57, 58, 35, 174, 192, 198, 207-212, 163, 167, 237, 238, 246

[56] References Cited

U.S. PATENT DOCUMENTS

| | | | |
|---|---|---|---|
| 1,250,668 | 12/1917 | Rzeszuto | 70/38 R |
| 1,538,936 | 5/1925 | Hess | 70/211 |
| 2,463,195 | 3/1949 | Mungan | 70/211 |
| 2,831,335 | 4/1958 | Kidd et al. | 70/58 |
| 4,098,102 | 7/1978 | Kalina | 70/237 |
| 4,228,974 | 10/1980 | Yates | 244/224 |
| 4,881,387 | 11/1989 | Kortenbrede | 70/39 |
| 4,888,968 | 12/1989 | Azvedo | 70/167 |

Primary Examiner—Galen Barefoot
Attorney, Agent, or Firm—Joseph C. Mason, Jr.; Ronald E. Smith

[57] ABSTRACT

A locking device made of two interfitting parts that holds the throttle control levers of an aircraft in their closed position when the parts are interfit. A key activated locking mechanism holds the two parts together. The throttle control levers are sandwiched between an upper transverse bar and the locking mechanism that secures the two parts to one another. An inclined surface formed mid-length of the upper transverse bar is inclined at the same angle as the throttle control levers when in their throttle closed position to confine the levers to the smallest possible space. A hemispherical-in-configuration cutaway is formed in the lower transverse bar and accommodates the yoke of the aircraft and restricts its movement.

15 Claims, 3 Drawing Sheets

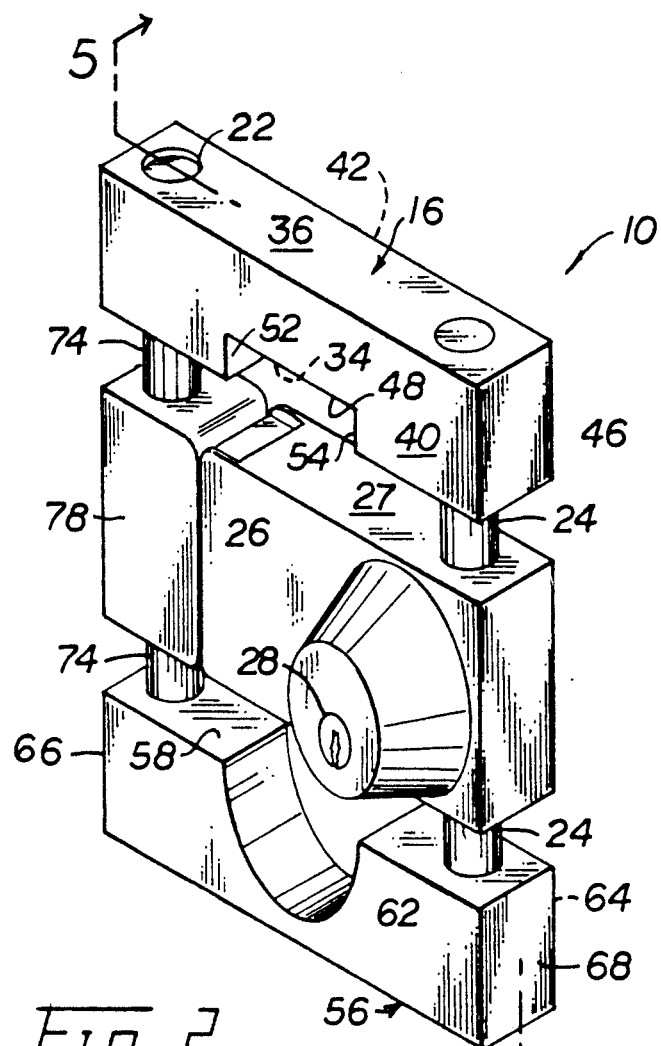
Fig_2
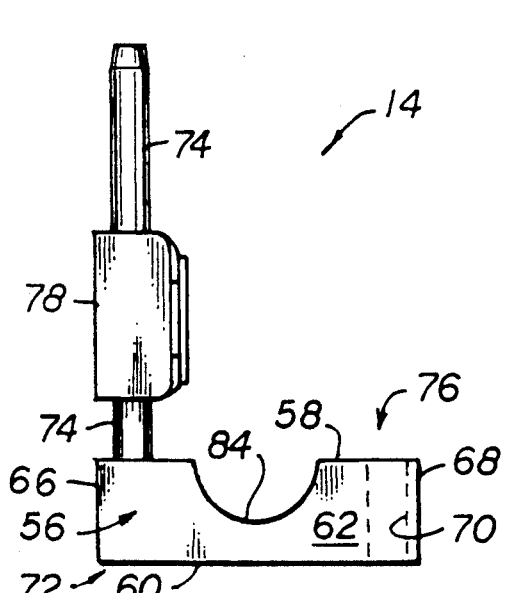
Fig_3
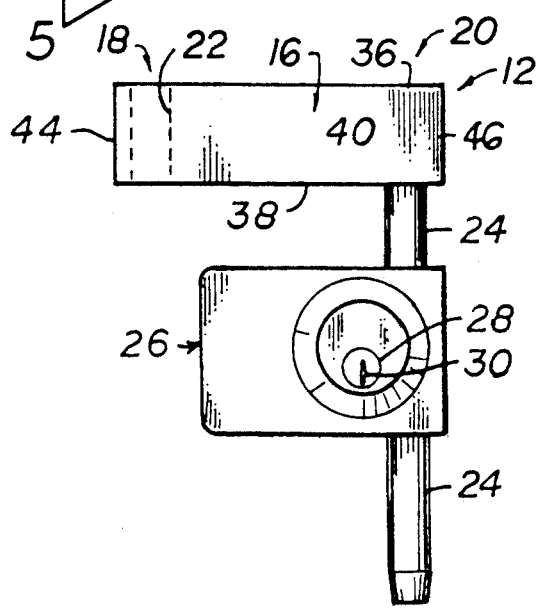
Fig_4

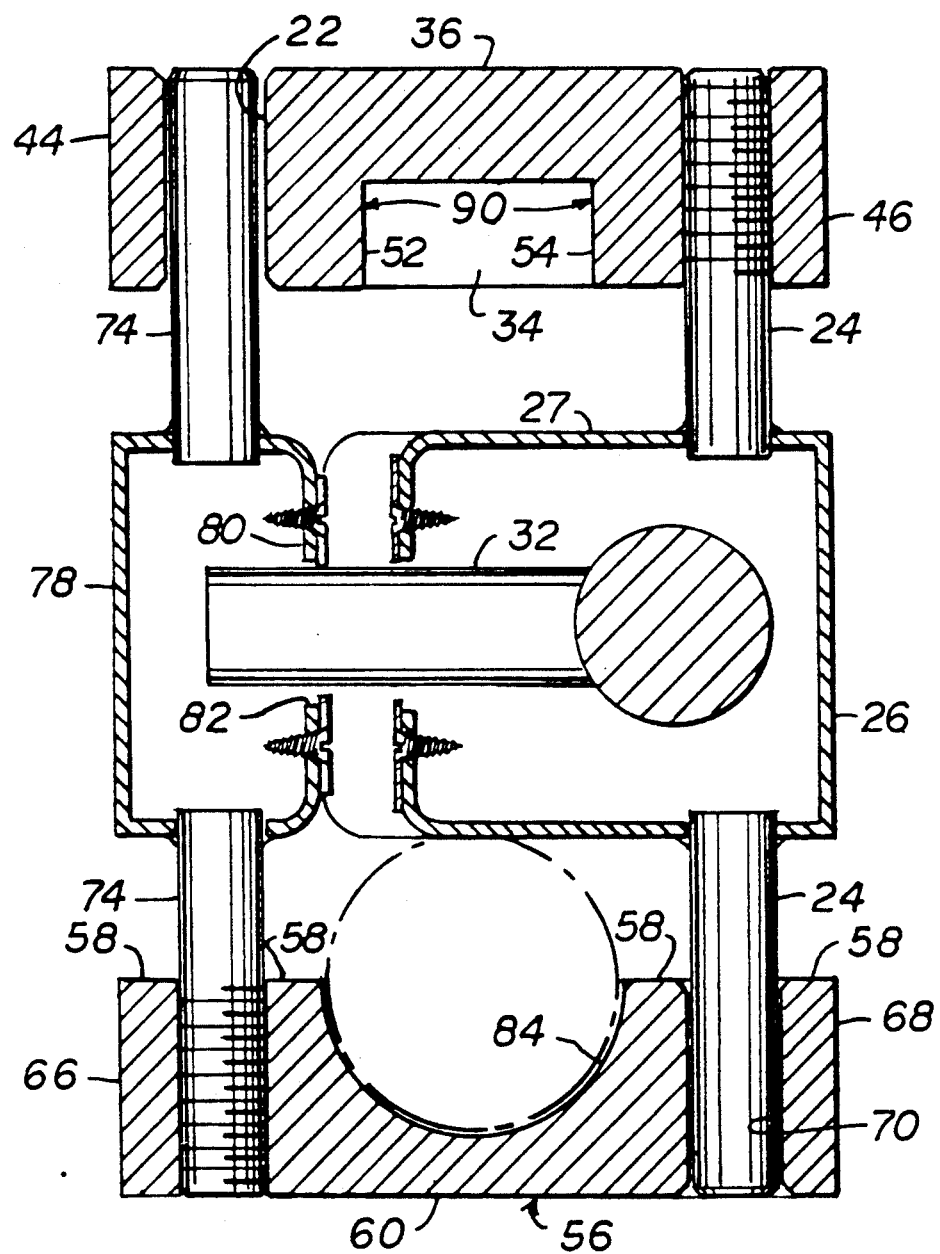
Fig_5

DEVICE FOR LOCKING AIRCRAFT CONTROLS

TECHNICAL FIELD

This invention relates, generally, to a device that locks the yoke and throttles of an aircraft of the type controlled by a wheel operated control column.

BACKGROUND ART

Aircraft theft has long been a problem. Accordingly, a number of inventors have developed various devices designed to prevent unauthorized taking of an aircraft. Some of the devices are simply improved door locks that defeat facile entry into the cockpit. If a thief overcomes the door lock, there are no further obstacles to a successful theft of the aircraft.

Accordingly, most inventors have focused their attention on devices that lock the controls of an aircraft, since, of course, an uncontrollable aircraft cannot be safely flown. U.S Pat. No. 4,299,361 to Webb shows a small plane yoke and column that are locked by a three piece lock. U.S. Pat. No. 4,076,095 to Adamski and 2,343,870 to James also show three piece locking assemblies having horizontal cross bars and vertical rods that are locked in place together to prevent the theft of a motor vehicle or the like.

Although the art is well developed, aircraft continue to be stolen. A need for an effective lock is clearly still extant, but the prior art neither teaches nor suggests how the art could be further developed.

DISCLOSURE OF INVENTION

The present invention is a device that prevents the throttles of a twin engine aircraft from being moved out of their closed position. It also impedes full movement of the yoke.

The device includes two primary parts, each of which has an "L" shape. The two parts form a rectangular frame member when they are assembled together, i.e., the top "L"-shaped part is inverted with respect to the bottom "L"-shaped part when the device is assembled.

The top or inverted part includes a transversely disposed top plate that has an inclined surface formed in its medial part, a first post member that depends from a first end of the top plate, and a bore means formed in a second end thereof.

The bottom part includes a transversely disposed bottom plate having a hemispherical in configuration recess formed in its medial part, a second post member projecting upwardly from a second end thereof, and a bore means formed in a first end thereof.

A key operated locking mechanism is carried by the first post member and the second post member carries a hollow housing means that receives a locking bar of the locking mechanism.

The device is placed into locking relation to the yoke and throttle control levers of an aircraft after both throttle control levers have been placed in their closed position. The top part of the device is placed so that the throttle control levers are disposed in sandwiched relation between the inclined surface formed in the medial part of the top plate and the locking mechanism carried by the first part. The second part of the device is then joined to the first part by positioning said second part so that the yoke of the aircraft is disposed in sandwiched relation between the hemispherical medial part of the bottom plate and the locking mechanism carried by the first post. The second post is slidably inserted into the bore means formed in the second end of the top plate and the first post is slidably received in the bore means formed in the first end of the bottom plate. Turning the key then sends the locking bar of the locking mechanism into the recess of the housing means carried by the second post member and the locking procedure is completed.

Importantly, the throttle control levers cannot be moved forwardly because the top plate bars such forward movement. The inclined surface formed in said top plate accommodates the throttle control levers.

Although the yoke can still move to some extent, its full range of motion is severely limited by the novel locking device. For example, the thickness of the bottom plate prevents the yoke from being pushed in all the way.

Since the throttle control levers cannot be used, the aircraft cannot leave the ground if driven by an unauthorized person. Moreover, the heavy duty construction of the novel lock defeats its facile destruction.

A primary object of this invention is to provide a heavy duty aircraft anti-theft device that locks the throttle control levers of a twin engine aircraft such as a Beechcraft Twin Bonanza in their closed positions.

Another object is to provide such a device that substantially impairs the movement of the aircraft yoke member.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 2 is a perspective view of the locking mechanism in its assembled configuration;

FIG. 3 is a front elevational view of a first part of the mechanism;

FIG. 4 is a front elevational view of a second part of the mechanism; and

FIG. 5 is a sectional view taken along line 5—5 in FIG. 2.

BEST MODES FOR CARRYING OUT THE INVENTION

Figure 1:
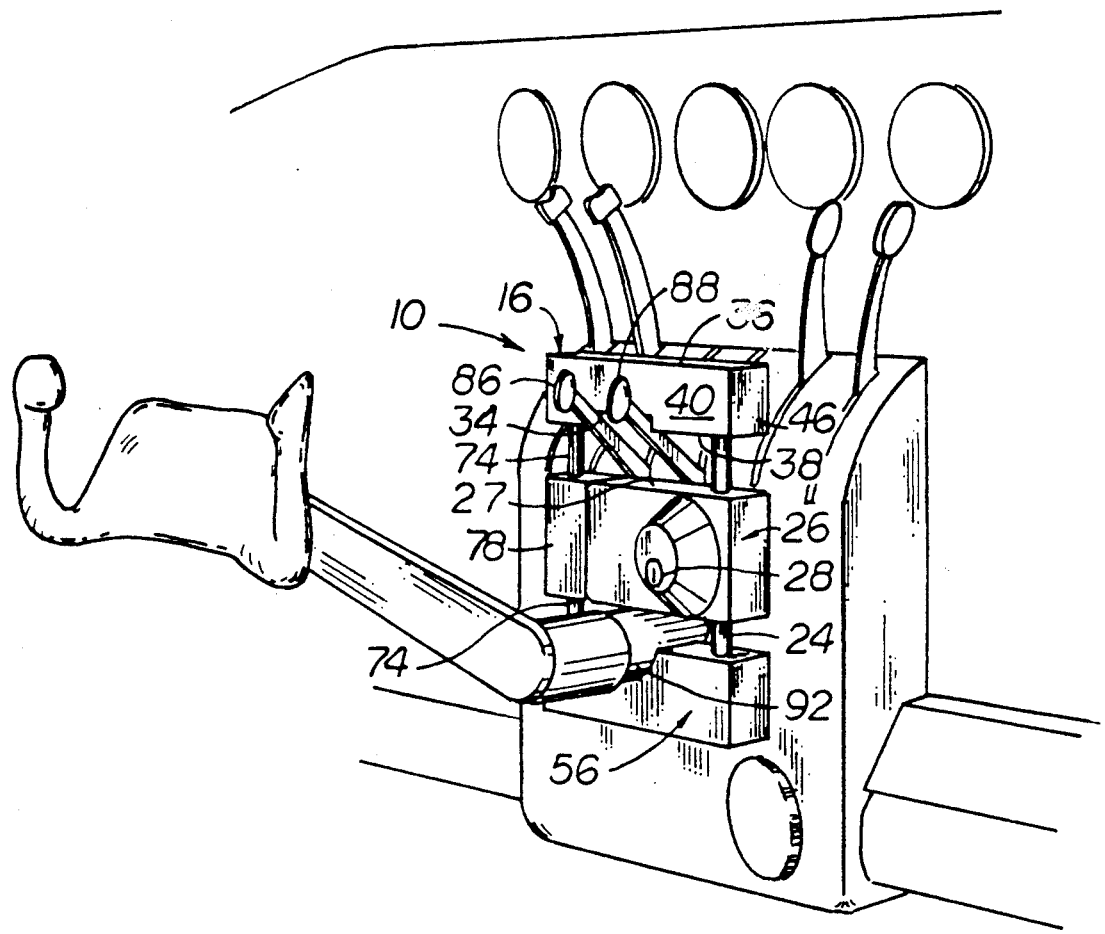
FIG. 1 is a perspective view of an airplane cockpit, showing the novel locking mechanism in its operative configuration.

Referring now to FIG. 1, it will there be seen that the novel device is denoted by the reference numeral 10 as a whole. As perhaps best understood in connection with FIGS. 2-5, the novel device has two parts, i.e., a top part and a bottom part.

Referring to FIGS. 3 and 4, the top part of device 10 is denoted 12 (FIG. 4), generally, and the bottom part is denoted 14 (FIG. 3).

Top part 12 includes transverse bar 16 having first end 18 and a second end 20. A bore means 22 is formed in first end 18 and a first post member 24 is integral to and depends from second end 20. Locking mechanism 26 having top wall 27 is fixedly secured to and is carried by first post member 24; it includes cylinder 28 that rotates under the action of key means 30. Locking bar 32 (FIG. 5) extends from locking mechanism 26 in the well known manner when cylinder 28 is rotated by key means 30 and is retracted into mechanism 26 when the cylinder 28 is returned to its unlocked position.

An inclined surface 34 is formed in upper transverse bar 16, substantially mid-length thereof, as perhaps best understood in connection with FIG. 1. More particularly, upper transverse bar 16 includes a flat top wall 36, bottom wall 38, front wall 40, back wall 42 and end walls 44, 46. Inclined surface 34 has a forward edge 48 (FIG. 2) formed in front wall 40 and a rearward edge (not shown) formed in back wall 42, downwardly of the forward edge 48. Accordingly, generally triangular edge walls 52, 54 are formed by inclined surface 34.

The construction of lower part 14 (FIG. 3) is similar to that of top part 12. Lower transverse bar 56 includes a top wall 58, bottom wall 60, front wall 62, back wall 64 and end walls 66, 68. A bore means 70 is formed in the second end 76 of lower bar 56 and a second post member 74 projects upwardly from first end 72 thereof as shown.

A hemispherical cutaway 84 is formed in the top, front and back walls 58, 62 and 64, respectively, of lower transverse bar 56 as shown.

A hollow housing member 78 having inner wall 80 (FIG. 5) is fixedly secured to and carried by said second post 74. Aperture 82 formed in wall 80 receives locking bar 32 when it is extended by key means 30. Second post member 74 is discontinuous within housing member 78 as shown to accommodate locking bar 32 when it is extended.

Having completely described the structure of the novel anti-theft means, its manner of use can now be set forth.

First, the aircraft's throttle control levers 86, 88 (FIG. 1) are placed in their respective closed or completely throttled positions, i.e., they are placed in their rearwardmost and downwardmost positions as depicted in FIG. 1, it being understood that the throttle control levers are pushed forwardly by the pilot when the engines are provided with more fuel. Upper transverse bar 16 is then placed over the fully closed throttle control levers 86, 88 until said levers are disposed in sandwiched relation between inclined surface 34 on the top thereof and top wall 27 of locking mechanism 26 therebelow. The angle of inclined surface 34 relative to a vertical plane is the same angle at which levers 86, 88 are positioned when in their respective fully closed positions as depicted in FIG. 1. The lateral extent of width 90 (FIG. 5) of inclined surface 34 is just slightly greater than the collective width of levers 86, 88 so that both of said levers are flanked by edge walls 52 and 54 when device 10 is properly installed.

Next, hemispherical cutaway 84 is placed in registration with the bottom surface of aircraft yoke 92 (FIG. 1). Concurrently, post member 74 is slidably inserted into bore means 22 formed in upper transverse bar 16. Finally, key means 30 is inserted into cylinder 28 and turned so that locking bar 32 is extended and slidably received within housing 78 through aperture 82 formed in inner wall 80 thereof. Once locking bar 32 has been fully extended, key means 30 is removed and the aircraft is secured. Neither throttle control lever 86, 88 can be moved forwardly, so even if a thief could gain access into the cockpit, the engines could not be fed sufficient fuel to allow the aircraft to fly. Moreover, although some freedom of movement will remain for yoke 92, its full freedom will be severely restricted in that the yoke cannot be pushed inwardly due to the thickness of lower transverse bar 56, as is apparent in FIG. 1, thereby further disabling the aircraft.

The heavy duty nature of lock 10 insures that it cannot be easily defeated by striking it, firing a bullet into it, sawing it and the like.

The specific aircraft for which the novel locking apparatus has been designed is the Beechcraft Twin Bonanza, but those skilled in the art of machine design can adapt the novel lock 10 to other types of aircraft without departing from the scope of this invention.

It will thus be seen that the objects set forth above, and those made apparent from the foregoing description, are efficiently attained and since certain changes may be made in the above construction without departing from the scope of the invention, it is intended that all matters contained in the foregoing description o shown in the accompanying drawings shall be interpreted as illustrative and not in a limiting sense.

It is also to be understood that the following claims are intended to cove all of the generic and specific features of the invention herein described, and all statements of the scope of the invention which, as a matter of language, might be said to fall therebetween.

Now that the invention has been described,

What is claimed is:

1. An aircraft anti-theft device for aircraft having at least one throttle control lever positioned in substantially vertical alignment with a yoke means, comprising:
   a lock assembly having a top part and a bottom part;
   said top part having an upper transverse bar member and said bottom part having a lower transverse bar member;
   a first post member fixedly secured to and depending from a first end of said upper transverse bar member in substantially orthogonal relation thereto;
   a first bore means formed in a second end of said upper transverse bar member;
   a key activated locking mechanism fixedly secured to said first post member about mid-length thereof;
   a second bore means formed in a first end of said lower transverse bar member;
   a second post member fixedly secured to and projecting upwardly from a second end of said lower transverse bar member; and
   a hollow housing member fixedly secured to said second post member, substantially mid-length thereof.

2. The device of claim 1, further comprising a key means and a movable locking bar disposed in said locking mechanism, said locking bar being movable between a retracted and extended position, relative to said locking mechanism, by action of said key means.

3. The device of claim 2, wherein a free end of said first post member is slidably received within said second bore means and a free end of said second post member is slidably received within said first bore means when said device is assembled.

4. The device of claim 3, further comprising an inclined surface formed in said upper transverse bar about mid-length thereof.

5. The device of claim 4, wherein said inclined surface is formed in said front wall, bottom wall and rearward wall of said upper transverse bar.

6. The device of claim 5, wherein the throttle control levers of an aircraft are held in a fixed position in sandwiched relation between said upper transverse bar and said locking mechanism when said locking bar means is in its extended configuration.

7. The device of claim 6, further comprising a hemispherical in configuration cutaway means formed in said lower transverse bar, said cutaway means accommodating the yoke of an aircraft control wheel when the device is assembled.

8. An aircraft anti-theft device, comprising:
a lock assembly;
a first part of said lock assembly including a transversely disposed upper bar member;
a bore means formed in a first end of said upper bar member;
a post member depending from a second end of said upper bar member;
a second part of said lock assembly including a transversely disposed lower bar member;
a bore means formed in a second end of said lower bar member;
a post member projecting upwardly from a first end of said lower bar member;
said post member depending from said upper bar member being slidably disposed in said bore means formed in said lower bar member;
said post member projecting upwardly from said lower bar member being slidably disposed in said bore means formed in said upper bar member;
a locking mechanism for holding said device together when said post members are slidably disposed in their associated bore means;
said locking mechanism including a locking bar member and a key-activated cylinder means for selectively retracting said locking bar member into said locking mechanism and extending said locking bar member from said locking mechanism;
said locking mechanism being fixedly secured to said post member depending to said upper bar member;
a hollow housing member that slidably receives said locking bar member when said locking bar member is extended from said locking mechanism;
said hollow housing member being fixedly secured to said post member that projects upwardly from said lower bar member; and
an inclined surface formed substantially mid-length of said upper bar member, said inclined surface being inclined forwardly from a bottom edge thereof to a top edge thereof.

9. The device of claim 8, wherein said inclined surface has an inclination substantially equal to the inclination of a throttle control lever of an aircraft when said lever is in its closed configuration.

10. The device of claim 9, further comprising a hemispherical-in-configuration cutaway means being formed in an upper surface of said lower bar member, said cutaway means receiving a lower surface of an aircraft yoke means when said device is assembled.

11. The device of claim 10, wherein said aircraft control lever is positioned in sandwiched relation between said inclined surface and said locking mechanism when said device is assembled.

12. The device of claim 11, wherein said aircraft yoke means is positioned in sandwiched relation between said hemispherical cutaway means and said locking mechanism when said device is assembled.

13. An aircraft anti-theft locking device of the type having utility in connection with aircraft having a pair of throttle control levers disposed in substantial vertical alignment with a yoke means that forms a part of a wheel operated control column, comprising:
a transversely disposed upper bar member;
a transversely disposed lower bar member;
said upper and lower bar members being disposed in vertical alignment with one another;
a pair of laterally spaced upstanding post members being disposed in interconnecting relation to said upper and lower bar members;
a locking assembly being disposed in interconnecting relation to said post members, about mid-height thereof;
said aircraft control levers extending between said upper bar member and said locking assembly when said levers are in their closed configuration;
said yoke means extending between said locking assembly and said lower bar member;
whereby said levers are held in sandwiched relation between said locking assembly and said upper bar member to prevent fuel from being applied to an engine of said aircraft; and
whereby said yoke means is held in sandwiched relation between said locking assembly and said lower bar member to restrict its free movement.

14. The device of claim 13, further comprising an inclined surface formed in said upper bar member, said inclined surface being disposed at an angle substantially equal to an angle defined by said levers when in their closed position.

15. The device of claim 14, further comprising a hemispherical-in-configuration cutaway means being formed in an upper surface of said lower transverse bar to receive said yoke means.

* * * * *